(12) United States Patent
Watson et al.

(10) Patent No.: US 7,543,070 B1
(45) Date of Patent: Jun. 2, 2009

(54) SYSTEM AND METHOD FOR NEGOTIATING MULTI-PATH CONNECTIONS THROUGH BOUNDARY CONTROLLERS IN A NETWORKED COMPUTING ENVIRONMENT

(75) Inventors: Robert N. M. Watson, Bethesda, MD (US); Darrell Kindred, Columbia, MD (US); Ed Lewis, Crownsville, MD (US); Brian Niebuhr, Columbia, MD (US); Olafur Gudmundsson, Washington, DC (US)

(73) Assignee: McAfee, Inc., Santa Clara, CA (US)

( * ) Notice: Subject to any disclaimer, the term of this patent is extended or adjusted under 35 U.S.C. 154(b) by 252 days.

(21) Appl. No.: 11/234,486

(22) Filed: Sep. 22, 2005

Related U.S. Application Data (62) Division of application No. 09/750,967, filed on Dec. 28, 2000, now Pat. No. 6,983,325.

(51) Int. Cl.
*G06F 15/16* (2006.01)
(52) U.S. Cl. ............... 709/228; 709/239; 370/351; 713/153
(58) Field of Classification Search ......... 709/249, 709/238, 245, 228, 239; 370/392, 351; 713/151, 713/153; 380/278; 710/29
See application file for complete search history.

(56) References Cited

U.S. PATENT DOCUMENTS

| | | | | |
|---|---|---|---|---|
| 6,061,454 A | * | 5/2000 | malik et al. | 380/278 |
| 6,446,144 B1 | * | 9/2002 | Habusha et al. | 710/29 |
| 6,591,306 B1 | * | 7/2003 | Redlich | 709/245 |
| 6,760,775 B1 | * | 7/2004 | Anerousis et al. | 709/238 |
| 6,772,334 B1 | * | 8/2004 | Glawitsch | 713/153 |
| 7,016,351 B1 | * | 3/2006 | Farinacci et al. | 370/392 |
| 7,055,027 B1 | * | 5/2006 | Gunter et al. | 713/151 |
| 2002/0004847 A1 | * | 1/2002 | Tanno | 709/249 |

* cited by examiner

*Primary Examiner*—Jungwon Chang
(74) *Attorney, Agent, or Firm*—Zilka-Kotab, PC (57) ABSTRACT

A system and method for negotiating multi-path connections between a plurality of intermediary devices, such as boundary controllers, in a networked computing environment is described. A client-side communications session is established between a requesting client and an intermediary device available from a plurality of intermediary devices on a primary communications channel in accordance with a connection-oriented network protocol. A server-side communications session is established between the intermediary device and the requested server on a primary communications channel in accordance with the connection-oriented network protocol. Differences in routing parameters defined for the client-side communications session and the server-side communications session are determined. The routing parameter differences are communicated to at least one other such intermediary device over an out-of-band communications channel.

21 Claims, 9 Drawing Sheets

SYSTEM AND METHOD FOR NEGOTIATING MULTI-PATH CONNECTIONS THROUGH BOUNDARY CONTROLLERS IN A NETWORKED COMPUTING ENVIRONMENT This a divisional application of U.S. patent application Ser. No. 09/750,967, now U.S. Pat. No. 6,983,325 filed Dec. 28, 2000, the disclosure of which is incorporated herein by reference.

FIELD OF THE INVENTION

The present invention relates in general to multi-path networks, and, in particular, to a system and method for negotiating multi-path connections through boundary controllers in a networked computing environment.

BACKGROUND OF THE INVENTION

Currently, computers are rarely operated in total isolation. Rather, most computers, particularly in a corporate setting, are networked. There are two basic types of networks. A local area network or "intranetwork" consists of individual computers and shared resources operating-within a single location, such as on one floor of a building. Similarly, a wide area network or "internetwork" consists of individual computers and resources, as well as intranetworks, interconnected over a distributed area, often geographically dispersed. The Internet, for example, is a public internetwork interconnecting clients worldwide.

Internetworks provide the infrastructure for emerging technologies that offer services to remote clients, such as electronic commerce. Remote clients send requests for goods, services, or information to each server. Many networks interface to the internetwork via a single link. Unfortunately, a single link has a limited throughput capacity and can quickly become saturated by service requests. In addition, the loss of the single link completely removes the network's services from the internetwork.

Therefore, networks containing servers that receive a high volume of service requests are often situated within a secure intranetwork having multiple connections (multi-paths) to the internetwork. A server is identified by a single network address and individual service requests are routed into and out of the intranetwork through a plurality of boundary controller or firewall devices. Service requests sent to the server can take different paths than responses generated by the server.

The multiple links provide several benefits. First, packets can be routed for improved throughput and load balancing. Although increased throughput could also be achieved by upgrading to a faster connection, high volume servers are generally connected to two or more Internet Server Providers (ISPs) for redundancy in the event of a hardware failure by an ISP. Structurally, most internetworks and intranetworks are based on a layered network model employing a stack of standardized protocol layers. The Transmission Control Protocol/Internet Protocol (TCP/IP) suite, such as described in W. R. Stevens, "TCP/IP Illustrated," Vol. 1, Ch. 1 et seq., Addison-Wesley (1994), the disclosure of which is incorporated herein by reference, is a widely adopted network model. Computers and network resources using the TCP/IP suite implement hierarchical protocol stacks that include link, network, transport and, for clients and servers, application protocol layers.

The application protocol layers enable the servers to provide client services, such as communications, file transfer, electronic mail, content retrieval, and resource sharing. Application protocol layers are either connection-oriented or connectionless. A connection is a negotiated link interconnecting a server and client used to transact a communication session during which packets are exchanged between the server and client application protocol layers.

Connections are created by the transport protocol layers. For instance, the Transmission Control Protocol (TCP) provides a connection-oriented, reliable, byte stream service that can be used by application layer protocols to transact sessions. Communication sessions require the stepwise initiation and termination of a dedicated connection. TCP sessions must be initiated through a negotiated three-way handshaking sequence and preferably terminated with a four-segment sequence that gracefully closes the connection.

Managing the connections for communication sessions requires additional processing in a multi-pathed network environment. For instance, in one type of multi-pathed network topology, firewalls and boundary controllers perform active network security by validating TCP session requests on behalf of a protected server. While effective at shielding the server from attack, such security measures require two separate communication sessions: one TCP session between the firewall or boundary controller and the client and a second TCP session between the firewall or boundary controller and the server. The TCP sessions are logically "spliced" together by translating sequence numbers for each session. However, each firewall or boundary controller operates independently of any other boundary controller protecting the server. Communicating sequence numbers between the components is difficult. Consequently, the TCP sessions are ordinarily restricted to the original firewall or boundary controller, thereby nullifying the benefits of multi-pathed connections.

Similarly, packets are dynamically switched along multiple paths in a multi-pathed network environment. Ideally, peer packets can follow any route through the internetwork so long as the packets eventually reach the same destination. However, boundary controllers are not able to effectively manage a connection if all of the packets do not flow though that same boundary controller.

In another type of multi-pathed network topology, link layer boundary controllers validate incoming packets. From the perspective of a server operating within the protected enclave, these devices are transparent as packets flow directly to and from the clients without apparent interception. However, for certain tasks, such as packet validation, the boundary controllers may need to function on behalf of the server. By operating at the link layer, the boundary controllers are not able to utilize the connection information contained in the headers for the network and transport layers and only one boundary controller can perform validation functions, again voiding any benefit gained through a multi-pathed topology.

Therefore, there is a need for an approach to negotiating multi-pathed connections for communications sessions in a layered networking environment. Preferably, such an approach would enable intermediary devices, such as firewalls and boundary controllers, to seamlessly communicate connection information between each other, thereby allowing dynamic routing of packets for a given connection. Moreover, such an approach would allow the sharing of transport layer connection information between link layer transparent intermediary devices.

SUMMARY OF THE INVENTION

The present invention provides a solution to negotiating multi-pathed connections in a networked computing environment employing dynamic packet routing. A client is interconnected to a server via a plurality of boundary controllers or similar intermediary devices. Packets flowing between the client and server can be dynamically routed along different paths through the boundary controllers. In one embodiment, client-side and server-side communications sessions are established by a boundary controller and the differences in connection parameters are determined and communicated to the other boundary controllers via an out-of-band communications channel. In an alternate embodiment, the boundary controllers are link layer devices that are transparent to the server. Session request parameters are indirectly shared with peer boundary controllers using echo request and reply packets.

An embodiment of the present invention is a system and method for negotiating multi-path connections between a plurality of intermediary devices in a networked computing environment. A client-side connection is established between a requesting client and an intermediary device available from a plurality of intermediary devices on a primary communications channel in accordance with a connection-oriented network protocol. A server-side connection is established between the intermediary device and the requested server on a primary communications channel in accordance with the connection-oriented network protocol. Differences in connection parameters defined for the client-side connection and the server-side connection are determined. The connection parameter differences are communicated to at least one other such intermediary device over an out-of-band communications channel.

A further embodiment is a system and method for communicating connection information between a plurality of link layer intermediary devices in a networked computing environment. A connection packet is received from a requesting client on a link layer intermediary device available from a plurality of link layer intermediary devices. An echo request packet is generated and identified as originating from the requesting client and addressed to a requested server. The echo request packet encapsulates the connection packet within the echo request packet and is forwarded to the requested server. An echo response packet is received from the requested server on at least one other such link layer intermediary device. The connection packet is unencapsulated from within the echo response packet and connection information is retrieved from the connection packet. A response packet is forwarded to the requesting client.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
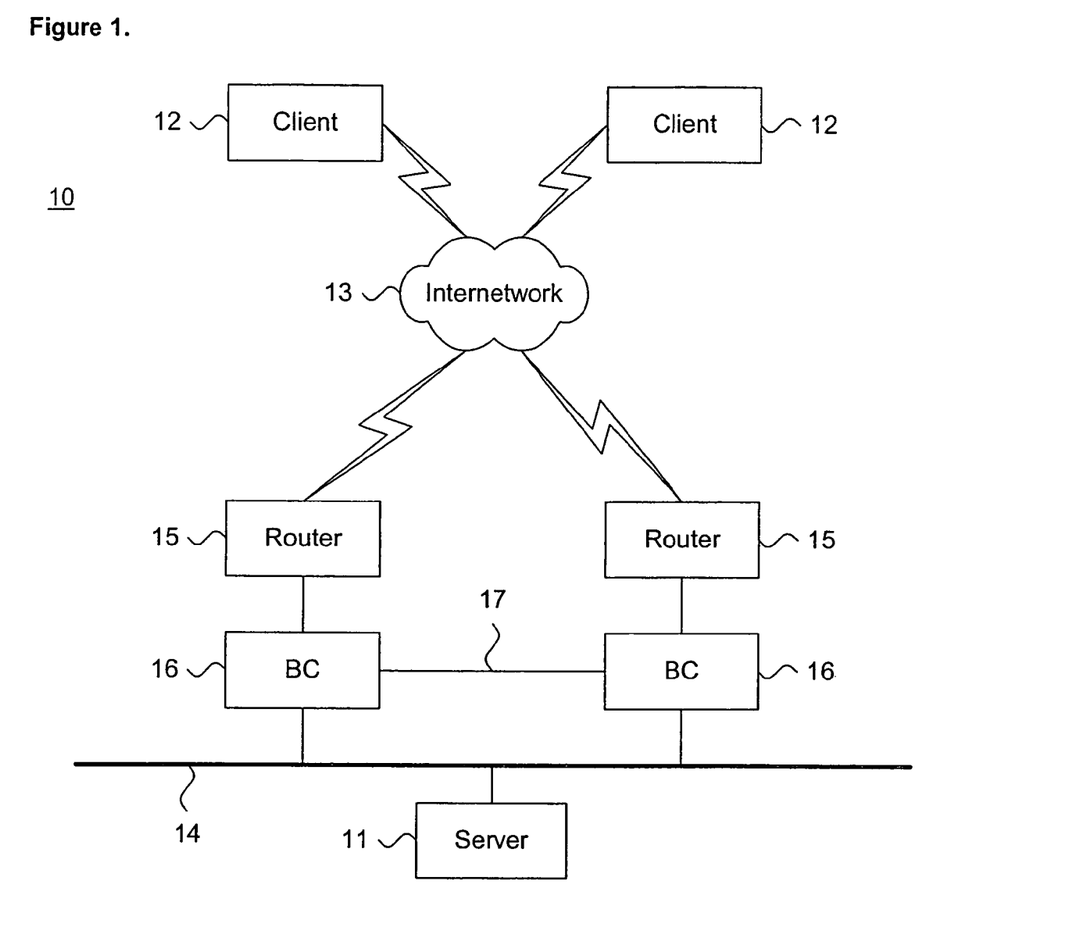
FIG. 1 is a block diagram showing a networked computing environment, including a system for negotiating multi-path connections through boundary controllers in a networked computing environment, in accordance with the present invention.

FIG. 1 is a block diagram showing a networked computing environment 10, including a system for negotiating multi-path connections through boundary controllers in a networked computing environment, in accordance with the present invention. A server 11 provides services, such as electronic commerce and information retrieval, to one or more clients 12 interconnected within the networked computing environment. The clients 12 principally access the server 11 via an internetwork 13, such as the Internet, although other forms of interconnectivity, such as dial-in or direct connections, are feasible.

The server 11 is indirectly interfaced to the internetwork 13 via an intranetwork 14. The intranetwork forms a protected enclave that buffers potential security breaches via a plurality of intermediary devices, such as boundary controllers (BC) 15, firewalls (not shown), or similar active or passive security devices. In one embodiment, the boundary controllers 16 are interconnected via an out-of-band communications channel, such as a broadcast, multicast, or secure point-to-point channel, as is known in the art and as further described below with reference to FIG. 5. In an alternate embodiment, the boundary controllers 16 are link layer devices that communicate indirectly through echo packets, as further described below with reference to FIG. 6.

To maximize throughput, redundancy, and bandwidth management, the intranetwork 14 has multiple links to the internetwork 13. A plurality of routers 15, or similar network traffic controlling devices, enable the clients 12 to transparently access the server 11 via a single network address. Network traffic is dynamically routed by the routers 15 along multiple paths that attempt to avoid packet congestion. For instance, all incoming traffic might be routed into the intranetwork 14 through a single router 15 while all outgoing traffic would be routed through the remaining routers 15.

As a general rule, the server 11 is susceptible to attack. One particularly invidious form of attack is the state consumption variant of denial of service (DoS) attacks, as further described below with respect to FIG. 2. As protection against attack, the boundary controllers 16 can incorporate various approaches to validating and authenticating client requests. However client requests are validated and authenticated, the present invention is primarily focused on providing connection information to a plurality of boundary controllers and similar intermediary devices which perform active and passive security measures to protect the server 11 from attack.

The individual computer systems, including server 11 and clients 12, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
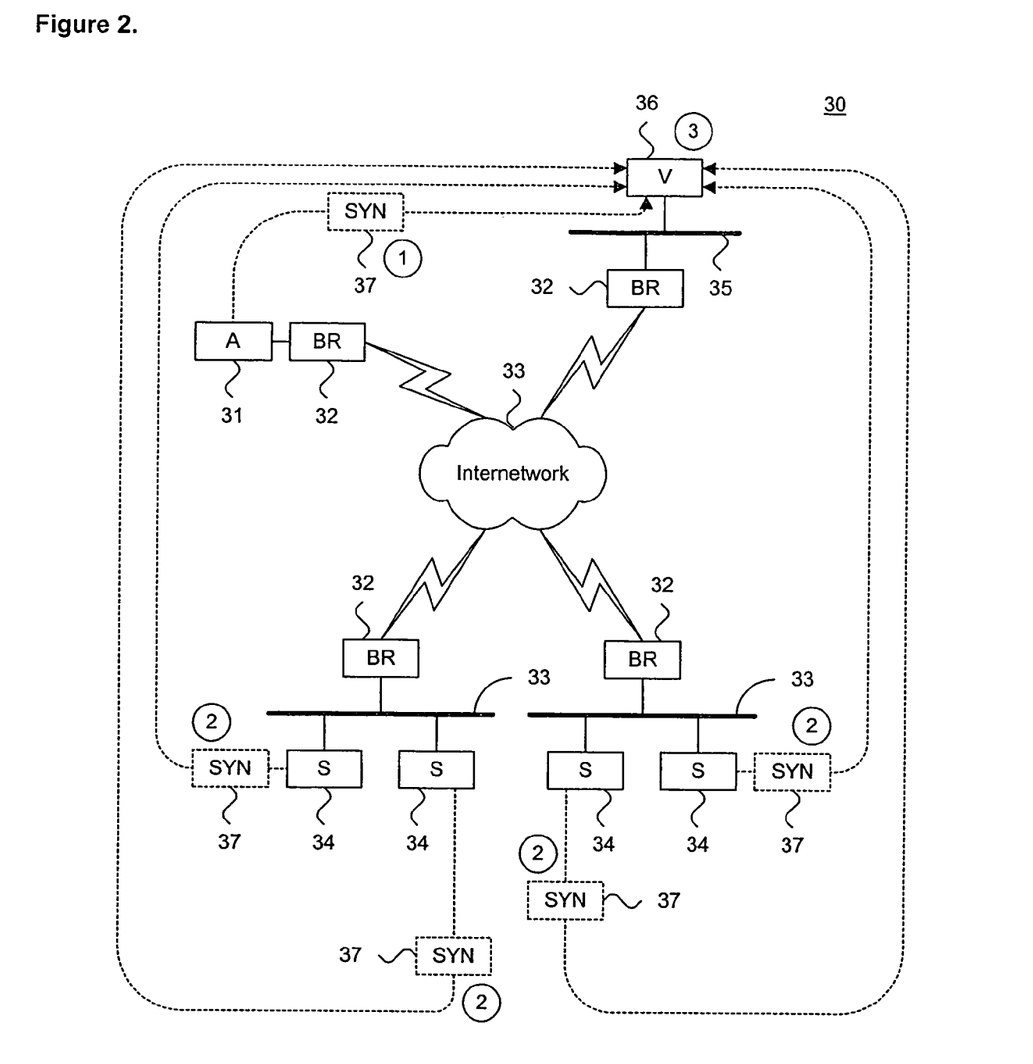
FIG. 2 is a network diagram illustrating, by way of example, the progression of a state consumption attack.

State consumption attacks are a specific type of DoS attack that can cripple or disable network servers 11 through invalid session requests. FIG. 2 is a network diagram 30 illustrating, by way of example, the progression of a state consumption attack in a non-multi-pathed networking environment. The goal of a state consumption attack is to induce a victim server 36 into allocating state, such as memory buffers and similar limited resources, through incomplete service requests. State consumption attacks occur in TCP/IP compliant computing environments with connection-oriented protocols, such as TCP, and would affect a multi-pathed server in the same manner as a server directly connected to the internetwork without a protected enclave.

Although several forms of state consumption attacks exist, the SYN flood attack is the most notorious. This type of attack relies upon inherent limitations in the TCP protocol. Ordinarily, when opening a new connection, a server 36 performs a three-way handshake sequence with a requesting client. The three-way handshake is further described in W. R. Stevens, "TCP/IP Illustrated," Vol. 1, Ch. 18, Addison-Wesley (1994), the disclosure of which is incorporated herein by reference. Briefly, the handshake begins when a requesting client sends a synchronize (SYN) request to a server indicating that the client wishes to establish a connection. The server allocates state upon receipt of the SYN request and sends a SYN/acknowledgement (ACK) response back to the requesting client. The client then sends back an ACK to confirm and establish the connection.

A state consumption attack progresses as follows. A plurality of individual intranetworks 33, 35 are interconnected via an internetwork 33 using conventional low- and high-bandwidth carriers interfaced via border routers 32 or similar devices. Other network topologies and configurations are feasible. An attacker 31 sends a stream of SYN request packets 37 with a fraudulent, that is, "spoofed," source address to a victim server 36 (step ①). The attacker 31 might also induce a plurality of servers 34 to send fraudulent SYN request packets 37 (step ②), such as through broadcast messaging. In turn, the victim server 36 allocates state (step ③)) ahd sends SYN/ACK response packets to the system indicated in the source address of each SYN request packet 37. However, since the source addresses are spoofed, no ACK packets are returned and the state on the victim server 36 remains allocated until each request times out. If a sufficient number of SYN request packets 37 are sent in rapid succession, all available state in the victim server 36 will be allocated to service the fraudulent SYN request packets 37. Thus, no state will be available for valid requests and the service will be denied.

Unfortunately, the SYN request packets 37 used to attack victim servers 36 resemble valid, bona fide traffic. Consequently, DoS attacks are difficult to detect. Moreover, state consumption attacks can also target ISP infrastructures 14 (shown in FIG. 1) resulting in a wider impact.

Figure 3:
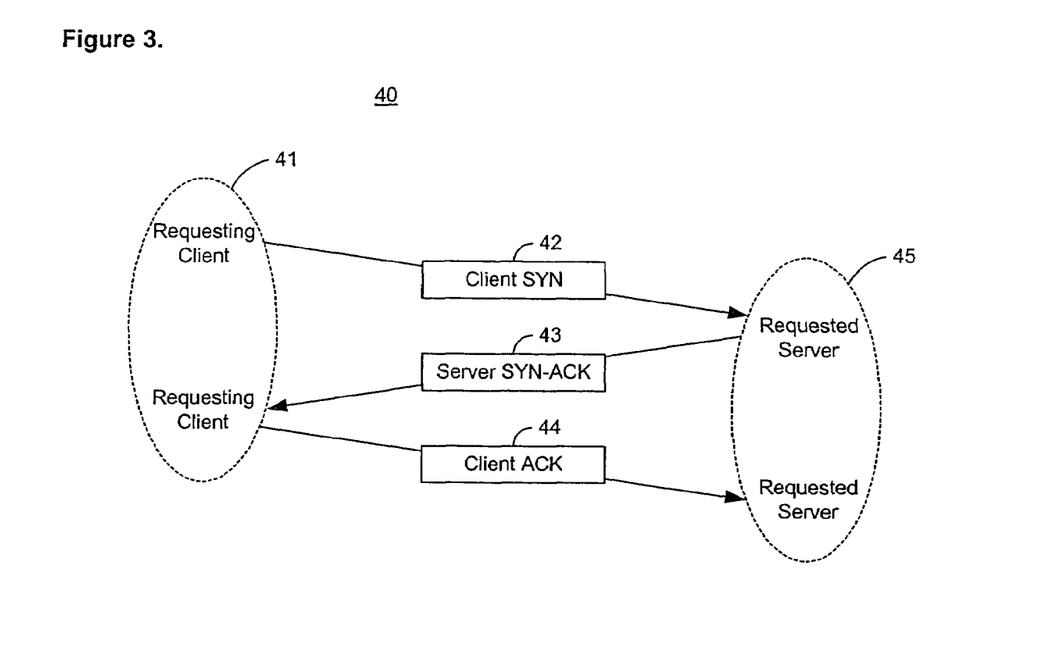
FIG. 3 is a timing diagram showing, by way of example, the three-way handshake performed during the initiation of a TCP session.

Spoofed SYN attacks deliberately misuse the three-way handshake sequence 40 executed between peer TCP layers to effect a DoS attack. FIG. 3 is a timing diagram showing, by way of example, the three-way handshake 40 performed during the initiation of a TCP session. Ordinarily, the handshake sequence 40 is transacted between a requesting client 41 and a requested server 45. Upon successful completion of the handshake sequence, session-based programs in the application protocol layers of the client 41 and server 45 communicate by exchanging TCP packets.

The TCP three-way handshake consists of three exchanges, such as described in W. R. Stevens, "TCP/IP Illustrated," Vol. 1, Chs. 17-18, Addison-Wesley (1994), and Postel, J. B., "Transmission Control Protocol," RFC 793 (September 1981), the disclosures of which are incorporated herein by reference. First, an initiating client sends a synchronize (SYN) packet 42 to a server. The SYN packet 42 has an internet protocol (IP) header containing fields for storing a source address and destination address and a TCP header containing fields for storing a source port number, destination port number, and sequence number n. The sequence number n is a 32-bit unsigned integer chosen by the initiating client.

The server responds by sending a SYN-acknowledgement (ACK) packet 43 addressed to the system located at the source address. The SYN-ACK packet 43 also has an IP header containing fields for storing a source address and destination address and a TCP header containing fields for storing a source port number, destination port number, sequence number n, plus an acknowledgement number m. The acknowledgement number m is also a 32-bit unsigned integer. The client's sequence number n is incremented by one to indicate acknowledgement by the server and is sent back to the system located at the source address in the acknowledgement number m field. In addition, the server includes its own sequence number in the sequence number n field.

Assuming the source address is valid, the initiating client returns an ACK packet 44 with the TCP header containing the sequence number n chosen by the server incremented by one in the acknowledgement field to indicate acknowledgement by the client. Thus, upon successful completion of the three-way handshake, the sequence number n field of the ACK packet 44 contains the client sequence number plus one and the acknowledgement number m field contains the server sequence number plus one.

Figure 4:
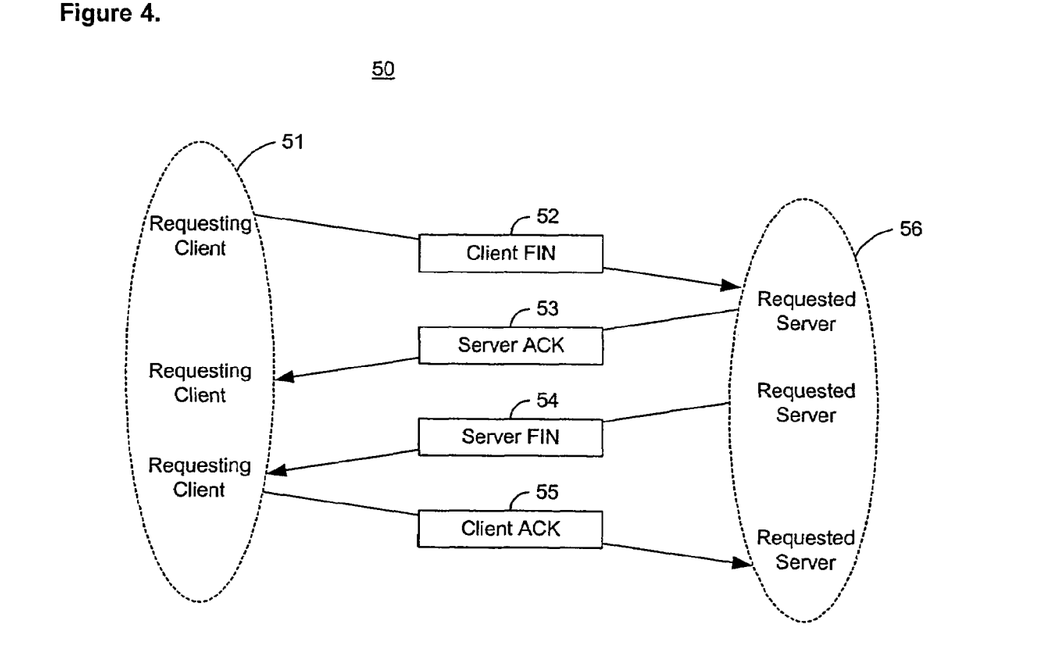
FIG. 4 is a timing diagram showing, by way of example, the four-segment sequence performed during the termination of a TCP session.

Upon the successful completion of the three-way handshake, the client and server exchange packets until the session is terminated. Preferably, the connection is gracefully terminated using the four-segment sequence, rather than via an abnormal termination that ends the session by abruptly ending all packet traffic. FIG. 4 is a timing diagram showing, by way of example, the four-segment sequence 50 performed during the termination of a TCP session.

Either the client 51 or server 56 can initiate the termination of a TCP session. The actual connection between a client 51 and server 56 consists of a pair of half duplex channels that operate independently of each other. Each half duplex line must be separately terminated. Generally, the requesting client 51 starts the termination sequence by sending a finish (FIN) packet 52. This packet notifies the server 56 that the client 51 is closing down the half duplex link sending packets from the client 51 to the server 56. The server 56 acknowledges the FIN packet 52 by sending an ACK packet 53. In addition, the server 56 notifies the client 51 that the server 56 is also closing down the half duplex link sending packets from the server 56 to the client 51. The server 56 sends a FIN packet 54 that the client 51 acknowledges with an ACK packet 55. The session is now terminated.

Figure 5:
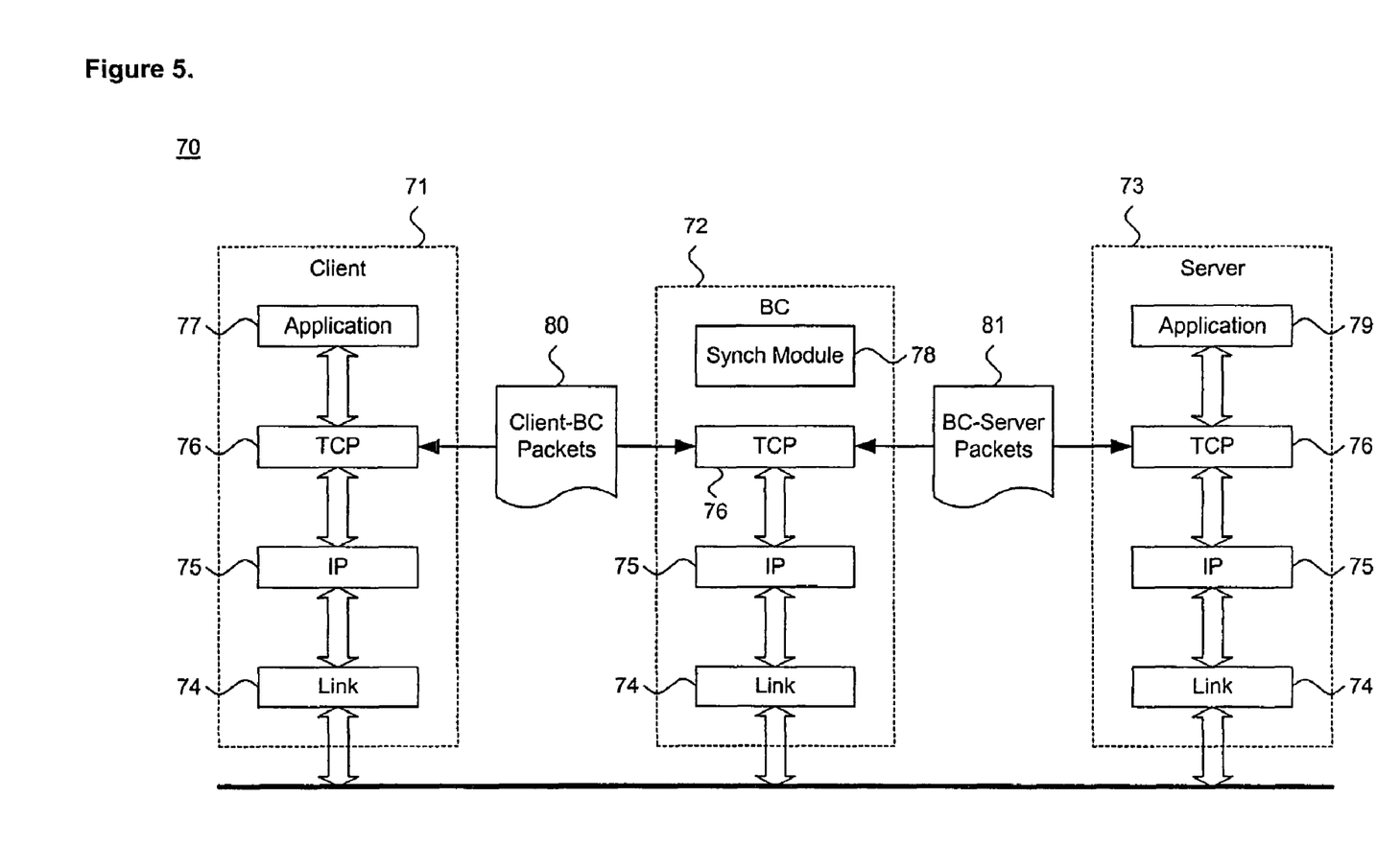
FIG. 5 is a block diagram showing a system for negotiating multi-path connections between a plurality of boundary controllers in a networked computing environment.

FIG. 5 is a block diagram showing a system 70 for negotiating multi-path connections between a plurality of boundary controllers in a networked computing environment. For the purpose of illustration, the networked computing environment consists of three types of systems: a requesting client 71, a boundary controller (BC) 72 (or firewall or similar intermediary device), and a requested server 73. Each of these systems implement a TCP/IP network protocol stack which includes link 74, IP 75 and TCP 76, layers, such as described in W. R. Stevens, "TCP/IP Illustrated," Vol. 1, Ch. 1 et seq., Addison-Wesley (1994), the disclosure of which is incorporated herein by reference. In addition, both the client 71 and server 73 implement client application 77 and server application 78 layers. In the case of a DoS attack on the server 73, the client application 77 is a malicious application that bypasses normal the normal client TCP layer 76 and IP layer 75 to send spoofed segments in an attempt to consume the state of the TCP layer 76 of the server 73.

In the described embodiment, the boundary controller 72 intercedes between the client 71 and the server 73 to perform the three-way handshake sequence and terminate communication sessions, as further described below with reference to FIG. 7. The boundary controller 72 functions as a pseudo server by exchanging client-boundary controller packets 79 with the client 71 and boundary controller-server packets 80 with the server 73. A client-boundary controller handshake sequence is first attempted by a validation module (not shown) of the boundary controller 72 and, if authenticated, a boundary controller-server handshake sequence is then performed.

Once fully connected, a synchronization module 78 within the boundary controller 72 determines the differences between the routing parameters used in the client-boundary controller connection versus the boundary controller-server connection. This information is shared with other boundary controllers in the networked computing environment via the out-of-band communications channel 17 (shown in FIG. 1). For a TCP communications session, the routing parameters consist of the difference between TCP session sequence numbers. In one embodiment, the boundary controller 72 communicates interim connection parameters to peer boundary controllers just after dispatching a response to the requesting client and prior to performing the boundary controller handshake sequence with the server 73. Any of the boundary controllers could then complete the three-way handshake with the client 71.

In an alternate embodiment, the boundary controller 72 does not share the connection parameters for transitory connections, that is, short duration connections used for simple data exchanges. This embodiment is possible in certain network configurations that do not employ asymmetric routing schemes and in which the route used by the packets is not likely to change. In this situation, the connection will initially pass through a single boundary controller. However, the longer the connection is open, the more likely a route change will occur, thereby necessitating knowledge of the connection by all boundary controllers.

Figure 6:
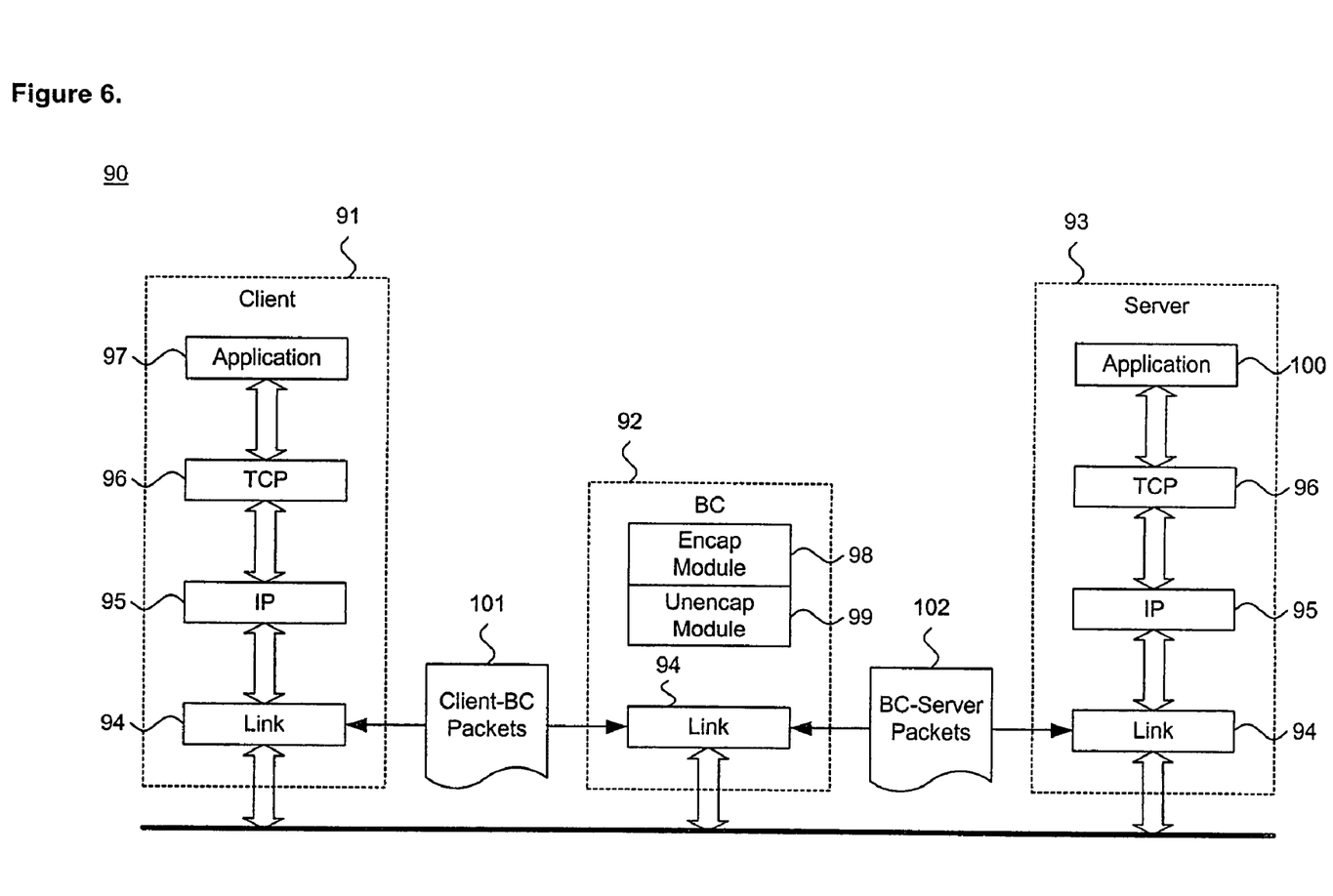
FIG. 6 is a block diagram showing a system for communicating connection information between a plurality of link layer boundary controllers in a networked computing environment.

FIG. 6 is a block diagram showing a system 90 for communicating connection information between a plurality of link layer boundary controllers in a networked computing environment. Again, to illustrate, the networked computing environment consists of three types of systems: a requesting client 91, a boundary controller (BC) 92, and a requested server 93. The requesting client 91 and requested server 93 implement full TCP/IP network protocol stacks which include link 94, IP 95 and TCP 96, layers. However, the boundary controller 92 only implements the link layer 94 and allows packets to flow directly through to the requesting client 91 and requested server 93. As before, both the client 91 and server 93 implement client application 97 and server application 98 layers.

In the described embodiment, the boundary controller 92 transparently intercedes between the client 91 and the server 93, as further described below with reference to FIG. 10. The boundary controller 92 acts on behalf of the server 93 to validate session requests originating from unauthenticated clients. However, the server 93 can be configured to send outgoing packets via any arbitrary network access point. Thus, the connection information must be shared between the peer boundary controllers to enable validation along any of the available paths into the internetwork 14 (shown in FIG. 1).

Consequently, the boundary controller 92 incorporates an encapsulation module 98 to wrap a connection request in a freely routable echo request packet. The echo request packet is identified as originating from the requesting client 91 and is addressed to the requested server 93. The echo request packet is formatted for communication in accordance with a control message protocol, such as the Internet Control Message Protocol (ICMP), that allows the entire session request to be carried as a payload. The requested server 93 generates an echo reply packet, also in accordance with the ICMP, that also includes the session request as a payload. Upon receipt of the echo reply packet, an unencapsulation module 99 also incorporated into the boundary controller 92 unwraps the session request and obtains the necessary connection information from the connection request. A validation packet is generated and forwarded to the requesting client 91.

In the described embodiment, the boundary controllers 72 and 92 are implemented on a programmed digital computer. As is conventional in the art, the boundary controllers 72 and 92 operate under the control of an operating system, such as the Unix or Windows NT operating systems. Alternatively, the boundary controllers 72 and 92 could be incorporated directly into a network protocol stack, such as a TCP/IP stack running on either a firewall, server, or client. As well, the boundary controllers 72 and 92 could be implemented as stand-alone programs or as program modules working in conjunction with an operating system, protocol stack, or other application, procedure, driver, or module. Finally, the boundary controllers 72 and 92 could be implemented entirely or partly in hardware, firmware, or software, as would be recognized by one skilled in the art.

Figure 7:
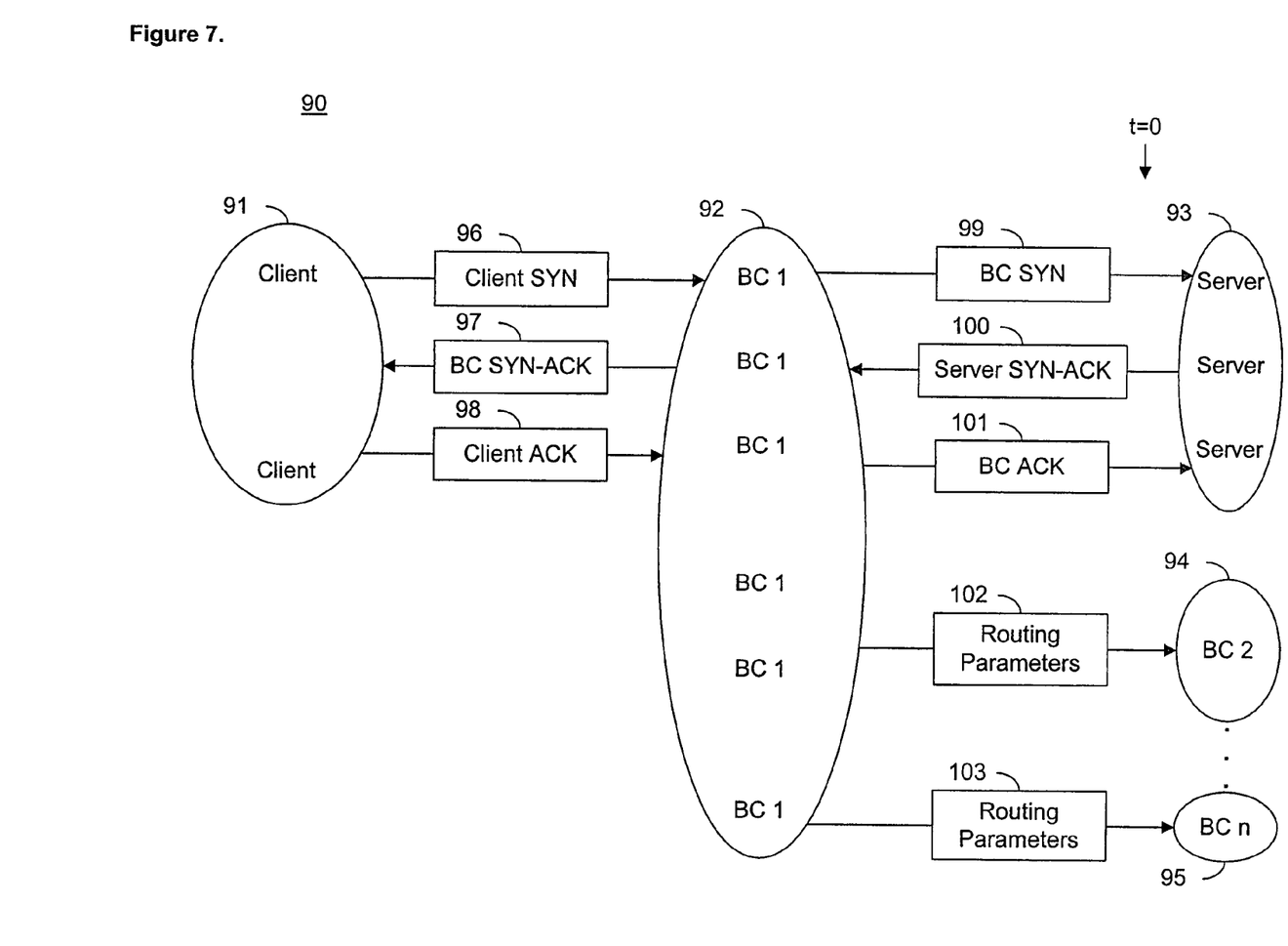
FIG. 7 is a timing diagram showing, by way of example, the communication of routing parameters between a plurality of boundary controllers via an out-of-band communications channel.

FIG. 7 is a timing diagram 90 showing, by way of example, the communication of connection parameters between a plurality of boundary controllers via an out-of-band communications channel. Briefly, a boundary controller 92 intercepts a session request from a requesting client 91 and only forwards the session request to a server 93 after checking the existence or validity of the requesting client 91 using a methodology such as described in the commonly assigned U.S. patent application, entitled "System And Method For Transacting A Validated Application Session In A Networked Computing Environment," filed Dec. 28, 2000, pending, the disclosure of which is incorporated by reference. Non-existent or invalid session requests are discarded, thereby preventing state consumption leading up to a DoS attack.

Chronologically, a requesting "client" 91 sends a client SYN packet 96 to the server 93. However, the boundary controller 92 intercepts the client SYN packet 96 and generates a server SYN-ACK packet 97. No state on the boundary controller 92 is consumed. The server SYN-ACK packet 97 contains a pseudo sequence number generated by the boundary controller 92.

The BC SYN-ACK packet 97 is addressed to the server at the source address specified in the TCP header of the client SYN packet 98. If a valid requesting client 91 sent the client SYN packet 96, the requesting client 91 will respond to the server SYN-ACK packet 97 by sending a client ACK packet 98.

However, if the client SYN packet 96 was spoofed, that is, sent with a fraudulent source address, two outcomes exist. First, if the spoofed source address is not in use by another server, no responding client ACK packet 96 will be generated and the original client SYN packet 96 will be ignored. Alternatively, if the spoofed source address is in use by another server but that server did not send the original client SYN packet 96, that server will send a client reset (RST) packet, as specified by the TCP. In either case, since the boundary controller 92 intercepted the spoofed client SYN packet 96 before reaching the server 93, no state is consumed or wasted, both on the server 93 and on the boundary controller 92.

Assuming the client SYN packet 96 originated from a valid requesting client 91, the boundary controller 92 will perform a three-way handshake with the server 93 to complete the connection. First, the boundary controller 92 sends a boundary controller SYN packet 99 to the server 93 upon receiving back a client ACK packet 98. The boundary controller SYN packet 99 contains the original sequence number contained in the TCP header of the client SYN packet 96. In response, the server 93 returns a boundary controller SYN-ACK packet 100 containing an acknowledgement number. Finally, the boundary controller 92 completes the three-way handshake by responding with a BC ACK packet 101.

The sequence numbers contained in all subsequent packets exchanged between the requesting client 91 and the server 93 during the communication session will need to be translated to account for the offset of the server-generated pseudo sequence number from the server-generated sequence number in the boundary controller SYN-ACK 100. Thus, the boundary controller 92 needs to share the difference between sequence numbers with each of the remaining boundary controllers 94, 95. Upon completion of the three-way handshake with the server 93, the boundary controller 92 sends the connection parameters 102, 103, including the sequence number difference and session information, to the other boundary controllers 94, 95 via the out-of-band communications channel 17 (shown in FIG. 1). Upon receiving the routing parameters 102, 103, the other boundary controllers 94, 95 will store the routing parameters 102, 103 to process packets transiting to or from the client 91 over a dynamically routed connection.

Optionally, the boundary controller 92 could communicate the connection parameters to the other boundary controllers 94, 95 upon sending the boundary controller SYN-ACK packet 97 and prior to transacting the three-way handshake with the server 93. Any of the boundary controllers 92, 94, 95 could then complete the three-way handshake with the client 91 in the event the client ACK packet 98 was dynamically routed to a boundary controller other than the original.

Alternatively, the boundary controller 92 could defer sending the connection parameters 102, 103 to the other boundary controllers 94, 95 for transitory connections. Short-lived connections generally proceed along the same packet route, even in a dynamically routed networking environment. This alternative would conserve state in the other boundary controllers 94, 95.

Figure 8:
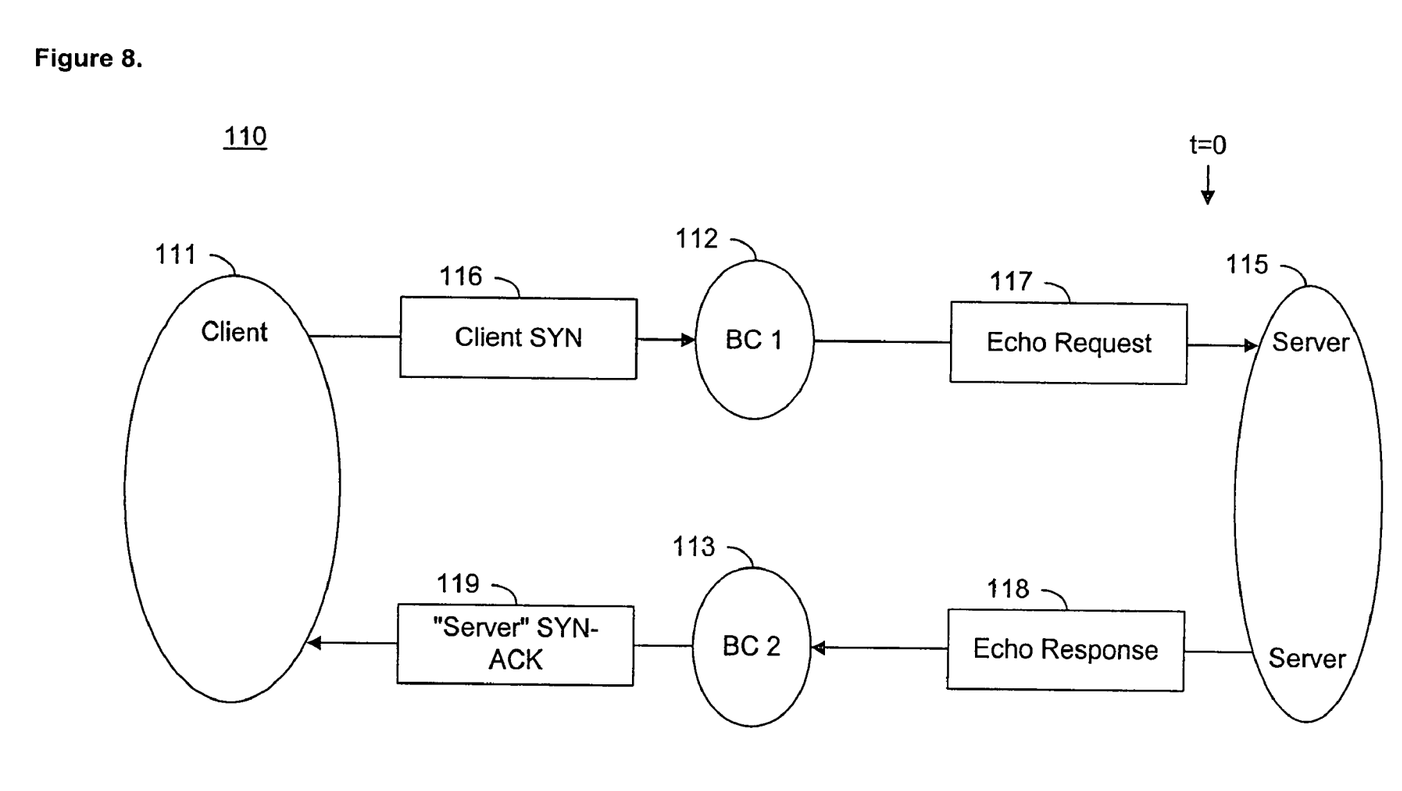
FIG. 8 is a timing diagram showing, by way of example, the communication of routing parameters between a plurality of link layer boundary controllers.

FIG. 8 is a timing diagram 110 showing, by way of example, the communication of connection parameters between a plurality of link layer boundary controllers. A link layer boundary controller 112 intercepts a connection request sent as a client SYN packet 116 from a requesting client 111. The link layer boundary controller 112 indirectly shares the routing parameters of the client SYN packet 116 with the other link layer boundary controllers 113 using echo packets. The original client SYN packet 116 is encapsulated into an echo request packet 117 and forwarded to the requested server 115. The echo request packet 117 is identified as originating from the client 111 and addressed to the requested server 115. In reply, the server 115 sends an echo response packet 118 to the client 111. The link layer boundary controllers 112, 113 intercept the echo response packet 118 and store the connection parameters to complete the validation and authentication of the session request. Finally, another link layer boundary controller 113 generates a pseudo "server" SYN-ACK packet 119 to validate and authenticate the connection request using a methodology such as described in commonly assigned U.S. patent application Ser. No. 09/655,515, filed Aug. 31, 2000, pending, and U.S. patent application Ser. No. 09/655,459, filed Aug. 31, 2000, pending, the disclosures of which are incorporated by reference.

Figure 9:
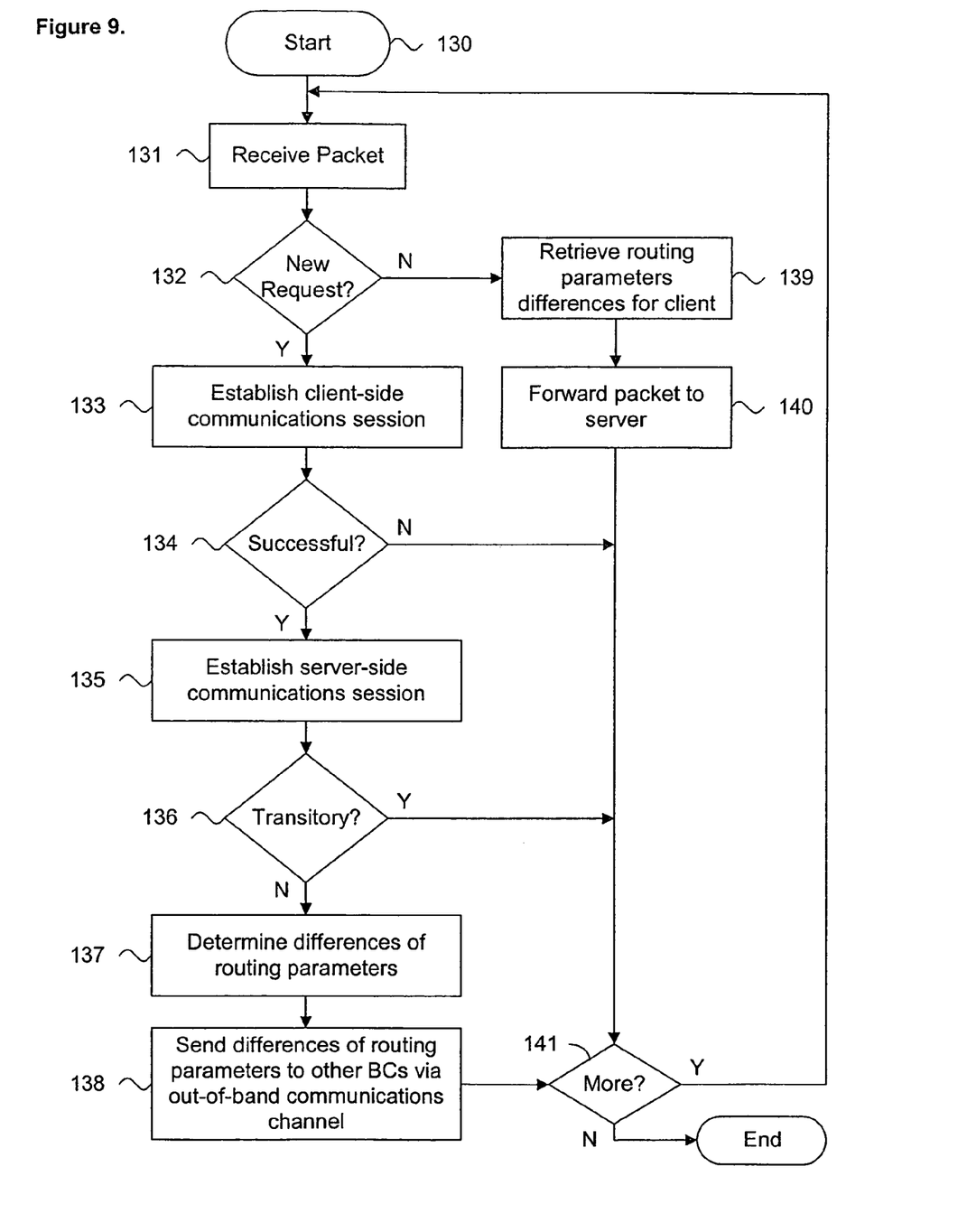
FIG. 9 is a flow diagram showing a method for negotiating multi-path connections between a plurality of boundary controllers in a networked computing environment in accordance with the present invention.

FIG. 9 is a flow diagram showing a method 130 for negotiating multi-path connections between a plurality of boundary controllers in a networked computing environment in accordance with the present invention. The method 130 is performed by each of the boundary controllers 92, 94, 95 (shown in FIG. 7) upon the receipt of each packet.

First, a packet is received at the boundary controller (block 131). If the packet constitutes a new session request (block 132), a client-side communications session is established (block 133). For example, a TCP session would require a successful three-way handshake between the boundary controller and the requesting client, such as described above with reference to FIG. 7.

In one embodiment (not shown), the connection parameters are communicated to the other boundary controllers to enable any boundary controller to participate in and complete the creation of the client-side communications session.

If successful (block 134), a server-side communications session is established (block 135). In alternate embodiment, transitory sessions (block 136) are not dynamically routed and are restricted to a single boundary controller. However, if the connection is not transitory (block 136), the differences ("A") between the routing parameters used in the client-side and server-side communications sessions is determined (block 137) and sent to the other boundary controllers via the out-of-band communications channel (block 138).

If the request is not for a new session (block 132), the stored connection parameter differences are retrieved (block 139) and the packet is forwarded to the server using the modified connection information (block 140).

The method repeats if there are more packets (block 141), after which the routine ends.

Figure 10:
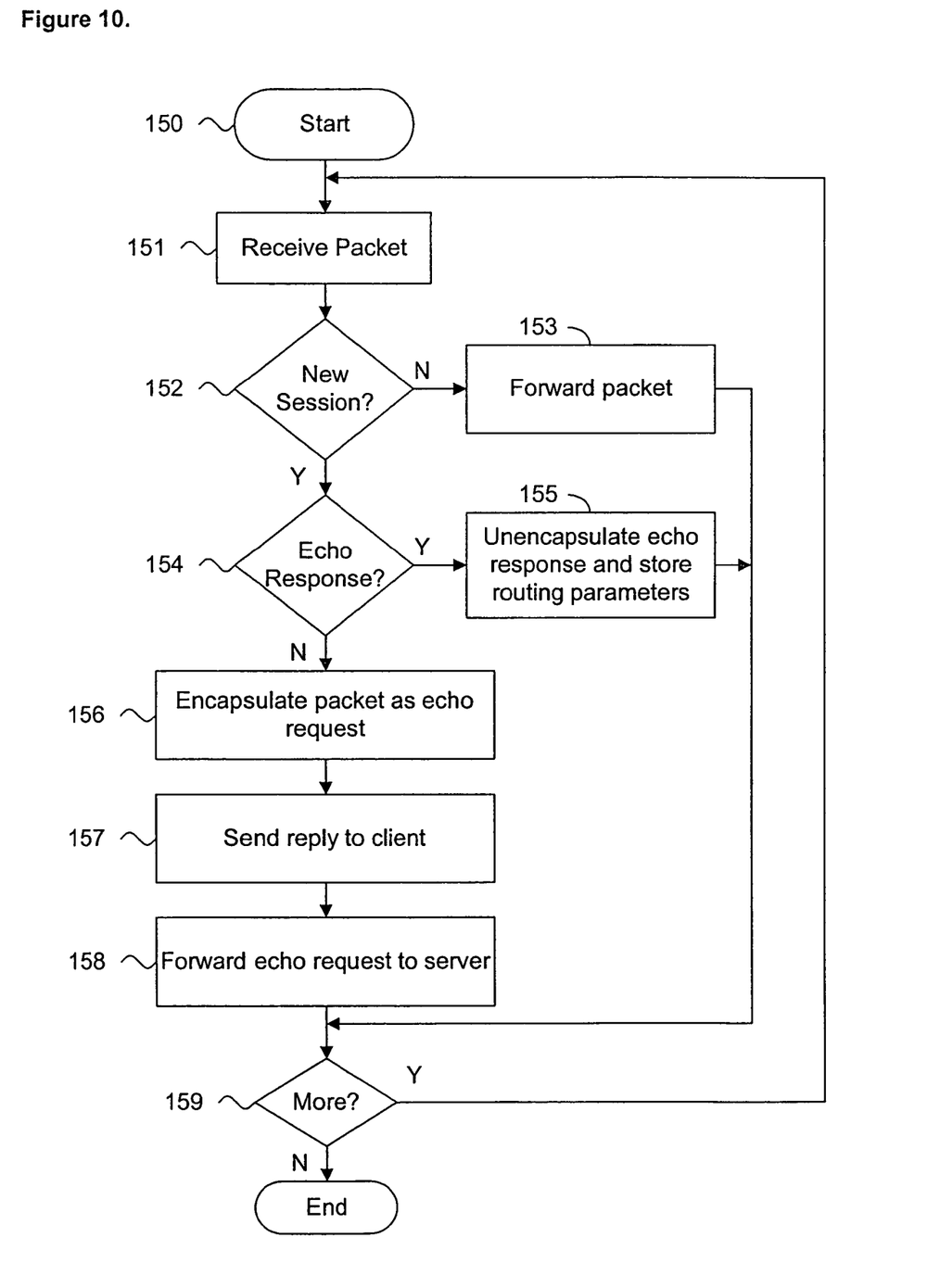
FIG. 10 is a flow diagram showing a method for communicating connection information between a plurality of link layer boundary controllers in a networked computing environment in accordance with the present invention.

FIG. 10 is a flow diagram showing a method 150 for communicating connection information between a plurality of link layer boundary controllers in a networked computing environment in accordance with the present invention. The method 150 is performed by each of the link layer boundary controllers 112, 113 (shown in FIG. 8) upon the receipt of each packet.

First, a packet is received at the boundary controller (block 151). If the packet does not constitute a new connection request (block 152), the packet is simply forwarded to the server (block 153).

Otherwise, if the packet constitutes a new connection request (block 152), further processing is performed. If the packet is an echo response packet (block 154), the original request packet from the client is unencapsulated from the payload of the echo response packet and the connection parameters are stored (block 155). If the packet is not an echo response packet (block 154), then the packet must be a session request packet that is then encapsulated as an echo request packet (block 156). A reply is sent to the requesting client (block 157) and the echo request packet is forwarded to the server (block 158).

The method repeats if there are more packets (block 159), after which the routine ends.

While the invention has been particularly shown and described as referenced to the embodiments thereof, those skilled in the art will understand that the foregoing and other changes in form and detail may be made therein without departing from the spirit and scope of the invention.

What is claimed is:

1. A system for communicating routing information between a plurality of link layer intermediary devices in a networked computing environment, comprising:
    a link layer intermediary device available from a plurality of link layer intermediary devices receiving a session packet including a connection request from a requesting client;
    an encapsulation module generating an echo request packet identified as originating from the requesting client and addressed to a requested server and encapsulating the session packet including the connection request within the echo request packet;
    the link layer intermediary device forwarding the echo request packet to the requested server;
    at least one other such link layer intermediary device receiving an echo response packet from the requested server;
    an unencapsulation module unencapsulating the session packet including the connection request from within the echo response packet and retrieving routing information from the session packet; and
    the at least one other such link layer intermediary device forwarding a response packet to the requesting client.

2. A system according to claim 1, wherein the echo request packet is an Internet Control Message Protocol (ICMP) echo request packet and the echo response packet is an ICMP echo response packet.

3. A system according to claim 1, further comprising a connection established between the requesting client and the link layer intermediary device in accordance with a connection-oriented network protocol.

4. A system according to claim 1, wherein the intermediary device comprises at least one of a firewall and a boundary controller.

5. A system according to claim 1, wherein the intermediary device includes a boundary controller.

6. A system according to claim 5, wherein the boundary controller implements link layer protocols.

7. A system according to claim 5, further comprising obtaining connection information from the unencapsulated session packet.

8. A system according to claim 7, wherein the connection information is shared between peer boundary controllers.

9. A system according to claim 7, wherein the connection information is shared between peer boundary controllers prior to transacting a handshake with the requested server.

10. A system according to claim 7, wherein the connection information passes through a single boundary controller.

11. A system according to claim 5, wherein the boundary controller is incorporated directly into a network protocol stack.

12. A system according to claim 11, wherein the network protocol stack runs on one of a firewall, a server, and a client.

13. A system according to claim 1, wherein the connection request includes a SYN packet.

14. A method for communicating routing information between a plurality of link layer intermediary devices in a networked computing environment, comprising:
    receiving a session packet including a connection request from a requesting client on a link layer intermediary device available from a plurality of link layer intermediary devices;
    generating an echo request packet identified as originating from the requesting client and addressed to a requested server and encapsulating the session packet including the connection request within the echo request packet;
    forwarding the echo request packet to the requested server;
    receiving an echo response packet from the requested server on at least one other such link layer intermediary device;
    unencapsulating the session packet including the connection request from within the echo response packet and retrieving routing information from the session packet; and
    forwarding a response packet to the requesting client.

15. A method according to claim 14, wherein the echo request packet is an Internet Control Message Protocol (ICMP) echo request packet and the echo response packet is an ICMP echo response packet.

16. A method according to claim 14, further comprising establishing a connection between the requesting client and the link layer intermediary device in accordance with a connection-oriented network protocol.

17. A computer-readable storage medium holding code for performing the method of claim 14.

18. A computer program product embodied on a computer readable storage medium for communicating routing information between a plurality of link layer intermediary devices in a networked computing environment, comprising:
    computer code for receiving a session packet including a connection request from a requesting client on a link layer intermediary device available from a plurality of link layer intermediary devices;
    computer code for generating an echo request packet identified as originating from the requesting client and addressed to a requested server and encapsulating the session packet including the connection request within the echo request packet on an encapsulation module;
    computer code for forwarding the echo request packet to the requested server on the link layer intermediary device;
    computer code for receiving an echo response packet from the requested server on at least one other such link layer intermediary device;
    computer code for unencapsulating the session packet including the connection request from within the echo response packet and retrieving routing information from the session packet on an unencapsulation module; and computer code for forwarding a response packet to the requesting client on the at least one other such link layer intermediary device.

19. The computer product of claim 18, wherein the echo request packet is an Internet Control Message Protocol (ICMP) echo request packet and the echo response packet is an ICMP echo response packet.

20. The computer product of claim 18, further comprising computer code for establishing a connection between the requesting client and the link layer intermediary device in accordance with a connection-oriented network protocol.

21. The computer product of claim 18, wherein the intermediary device comprises at least one of a firewall and a boundary controller.

\* \* \* \* \*